March 30, 1965 MITSUO MATSUSHIMA ETAL 3,176,217

COMBINED UNIT OF RESISTANCE AND INDUCTANCE

Filed Jan. 23, 1962

INVENTOR.
MITSUO MATSUSHIMA &
SHIGEAKI OGAWA
BY
Blum, Moscovitz,
Friedman & Blum 3,176,217

COMBINED UNIT OF RESISTANCE AND INDUCTANCE

Mitsuo Matsushima, Nikaho-machi, Yuri-gun, Akita-ken, and Shigeaki Ogawa, Kisakata-machi, Yuri-gun, Akita-ken, Japan, assignors to Tokyo Denki Kagaku Kogyo Kabushiki Kaisha, Tokyo, Japan Filed Jan. 23, 1962, Ser. No. 168,202
Claims priority, application Japan, Jan. 26, 1961, 36/2,803
3 Claims. (Cl. 323—73)

This invention relates to an improvement in a combined unit of resistance and inductance, and particularly to such units as components of radio and/or television receivers.

Heretofore, aggregated units of resistance and inductance as parts of radio and television receivers have been known. However, there has not been a combined unit of resistance and inductance.

One object of this invention is to provide a combined unit of resistance and inductance in which the high resistance of ferrite itself is utilized, or in which a ferrite core is made to act organically, whereby the unit can be constructed extremely simply and the overall size thereof is made small.

Briefly stated in accordance with one aspect of this invention, there is provided an impedance unit of resistance and inductance, comprising a ferrite core comprising two discs of the same size and integrally united through an intermediate or central portion with each other so as to have an H-shaped axial or vertical cross section. A winding is provided between the two discs and around the intermediate portion so as to form an inductance. Two terminals are provided, each on the outer surface of a respective disc so as to form a resistance therebetween.

The invention will be better understood and other objects and additional advantages of the invention will become apparent upon perusal of the following description taken in connection with the drawings, and the scope of the invention will be defined in the appended claims.

Figure 1:
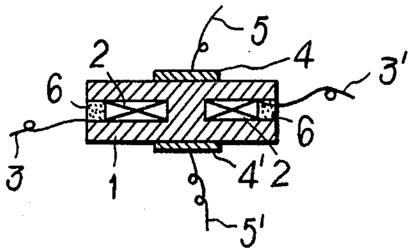
Figure 2:
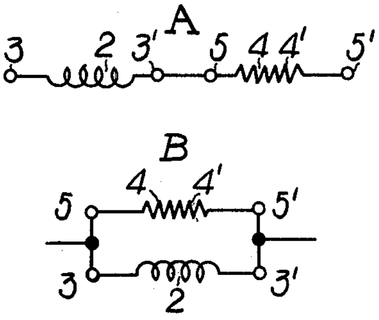

In the drawings, FIG. 1 is an axial or vertical cross section view of a combined unit embodying this invention; and FIGS. 2A and 2B are two different schematic wiring diagrams thereof.

Referring more particularly to the drawings, the preferred embodiment of this invention will now be described; however, this description will be understood to be illustrative of the invention and not as limiting it to the particular construction shown and described. There is a ferrite core 1 comprising two discs and an intermediate or central portion. They are integrated with one another to form a one-piece core having an H-shaped axial or vertical cross section. The ferrite core 1 has a suitable specific resistance. A winding 2 is provided around the intermediate portion and between the two disc ends, having two lead wires 3 and 3' so as to form an inductance L between the two lead wires 3 and 3'. Terminals 4 and 4' are positioned on the outer surfaces of the respective ferrite disc ends and have lead wires 5 and 5', respectively, so as to form a specific resistance R between the two lead wires 5 and 5'.

The space around the winding 2 and between the two discs is filled with a thermoplastic synthetic resin so as to minimize leakage flux. The resin is mixed with pulverized ferrite to provide an excellent control of the desired inductance value.

In the unit thus formed, the lead wires may be connected as shown in either of FIGS. 2A and 2B, that is, in series with the lead wire 3' being connected with the lead wire 5, as shown in FIG. 2A, or in parallel with the lead wire 3 being connected with the lead wire 5 and the lead wire 3' being connected with the lead wire 5', as shown in FIG. 2B.

While a particular embodiment of the invention has been illustrated and described, modifications thereof will readily occur to those skilled in the art. It should be understood therefore that the invention is not limited to the particular arrangement disclosed but that the appended claims are intended to cover all modifications which do not depart from the true spirit and scope of the invention.

What we claim is:

1. An impedance device combining resistance and inductance, said impedance device comprising an integral one-piece ferrite core having relatively large diameter imperforate circular disc ends joined by a relatively small diameter circular cross-section solid central section coaxial with said disc ends to provide an H-shape axial cross section; a winding on said central section having an outer diameter less than the diameter of said disc ends and disposed completely within the peripheries of the latter; terminal means electrically connected to the outer surfaces of the respective disc ends to form the connections for the resistance components; and lead wires on the respective ends of said winding to form the connections for the inductance component.

2. An impedance device combining resistance and inductance, as claimed in claim 1, in which said core has an axial dimension less than the diameter of said disc ends.

3. An impedance device combining resistance and inductance, as claimed in claim 1, including an annular body of synthetic resin admixed with pulverized ferrite surrounding said winding and extending between said disc ends; the pulverized ferrite content of said annular body being selected in accordance with a pre-selected inductance value of said device.

References Cited by the Examiner

UNITED STATES PATENTS

| | | | |
|---|---|---|---|
| 426,153 | 4/90 | Wagemann | 336—177 |
| 2,075,380 | 3/37 | Varian | 336—177 |
| 2,220,126 | 11/40 | Six | 336—233 |
| 2,599,068 | 6/52 | Potter | 336—233 |
| 2,976,502 | 3/21 | Hill | 336—83 |

LLOYD McCOLLUM, *Primary Examiner.*